United States Patent
Persson et al.

[11] Patent Number: 6,085,107
[45] Date of Patent: Jul. 4, 2000

[54] POWER PRESETTING IN A RADIO COMMUNICATION SYSTEM

[75] Inventors: Anders Håkan Persson, Stockholm; Paul Peter Butovitsch, Bromma; Carl Magnus Thornberg, Stockholm, all of Sweden; Joseph Eric Turcotte, Montreal, Canada; Anisur M. Rahman, Randolf, N.J.

[73] Assignee: Telefonaktiebolaget LM Ericsson, Stockholm, Sweden

[21] Appl. No.: 08/974,828

[22] Filed: Nov. 20, 1997

Related U.S. Application Data

[62] Division of application No. 08/678,313, Jul. 11, 1996.

[51] Int. Cl.$^7$ ..................................................... H04Q 7/20
[52] U.S. Cl. ............................ 455/522; 455/69; 455/432; 455/436; 455/444; 370/318
[58] Field of Search ................... 455/69, 422, 426, 455/432, 436, 444, 446, 517, 522, 524, 525; 370/318, 331, 252; 375/200, 206

[56] References Cited

U.S. PATENT DOCUMENTS

| | | | |
|---|---|---|---|
| 5,056,109 | 10/1991 | Gilhousen et al. . | |
| 5,148,548 | 9/1992 | Meche et al. | 455/63 |
| 5,151,919 | 9/1992 | Dent . | |
| 5,287,544 | 2/1994 | Menich et al. | 455/63 |
| 5,297,161 | 3/1994 | Ling . | |
| 5,345,598 | 9/1994 | Dent . | |
| 5,386,589 | 1/1995 | Kanai . | |
| 5,455,967 | 10/1995 | Amezawa et al. | 455/522 |
| 5,475,861 | 12/1995 | Hall . | |
| 5,483,676 | 1/1996 | Mahany et al. . | |
| 5,485,486 | 1/1996 | Gilhousen et al. | 455/522 |
| 5,487,174 | 1/1996 | Persson | 455/522 |
| 5,491,717 | 2/1996 | Hall | 455/522 |
| 5,539,728 | 7/1996 | Gaiani et al. | 455/69 |
| 5,548,812 | 8/1996 | Padovani et al. . | |
| 5,551,057 | 8/1996 | Mitra | 455/522 |
| 5,596,570 | 1/1997 | Soliman . | |
| 5,603,096 | 2/1997 | Gilhousen et al. . | |
| 5,697,053 | 12/1997 | Hanly | 455/522 |

FOREIGN PATENT DOCUMENTS

| | | |
|---|---|---|
| WO96/03813 | 2/1996 | WIPO . |
| WO 97/08862 | 3/1997 | WIPO . |
| WO 98/56200 | 12/1998 | WIPO . |

*Primary Examiner*—Dwayne D. Bost
*Assistant Examiner*—Nay Maung
*Attorney, Agent, or Firm*—Burns, Doane, Swecker & Mathis, L.L.P.

[57] ABSTRACT

A radio communication method and system employs power level presetting to mitigate the increase in interference caused by the discontinuous transmission of mobile stations. In the downlink, power presetting entails detecting the entry (or removal) of mobile stations to a cell, and in response thereto, calculating a plurality of power adjustment values for each mobile station within the cell. In the uplink, power presetting entails estimating an increase in interference caused by the entry (or removal) of mobile stations to a cell, and using this estimate for calculating an updated power target for each mobile station within the cell. Power presetting is also initiated in response to one or more mobile stations switching from high data-rate mode to low data-rate mode, or vice versa.

8 Claims, 9 Drawing Sheets

Downlink SIR for different number of iterations for the DL power control improvement.

POWER PRESETTING IN A RADIO COMMUNICATION SYSTEM

This application is a divisional of application No. Ser. 08/678,313 filed Jul. 11, 1996.

BACKGROUND

The present invention is directed generally to radio communication systems and, more particularly, to techniques and structures for presetting transmit power levels in radio communication systems.

Traditionally, radio communication systems have employed either Frequency Division Multiple Access (FDMA) or Time Division Multiple Access (TDMA) to allocate access to available radio spectrum. Both methods attempt to ensure that no two potentially interfering signals occupy the same frequency at the same time. For example, FDMA assigns different signals to different frequencies. TDMA assigns different signals to different timeslots on the same frequencies. TDMA methods reduce adjacent channel interference through the use of synchronization circuitry which gates the reception of information to prescribed time intervals.

In contrast, Code Division Multiple Access (CDMA) systems allow interfering signals to share the same frequency at the same time. More specifically, CDMA systems "spread" signals across a common communication channel by multiplying each signal with a unique spreading code sequence. The signals are then scrambled and transmitted on the common channel in overlapping fashion as a composite signal Each mobile receiver correlates the composite signal with a respective unique despreading code sequence, and thereby extracts the signal addressed to it.

Figure 1A:
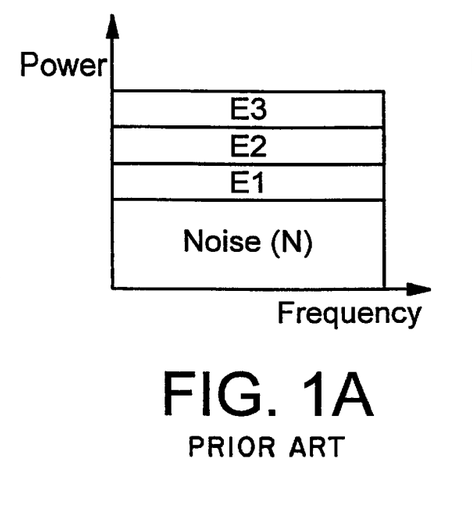
FIG. 1A shows an exemplary distribution of signal energies within a common band in a steady state condition.

The signals which are not addressed to a mobile receiver in CDMA assume the role of interference. To achieve reliable reception of a signal, the ratio of the signal to the interference should be above a prescribed threshold for each mobile station (referred to as a "required signal-to-interference" level, or $SIR_{req}$). For example, as shown in FIG. 1A, consider the case where three mobile stations receive, respectively, three signals from the common CDMA communication band. Each of the signals has a corresponding energy associated therewith—namely energy levels E1, E2 and E3, respectively. Also, present on the communication band is a certain level of noise (N). For the first mobile station to receive its intended signal, the ratio between E1 and the aggregate levels of E2, E3 and N must be above the first mobile's required signal-to-interference ratio.

To improve the signal to interference ratio for a mobile, the energy of the signal is increased to appropriate levels. However, increasing the energy associated with one mobile station increases the interference associated with other nearby mobile stations. As such, the radio communication system must strike a balance between the requirements of all mobile stations sharing the same common channel. A steady state condition is reached when the SIR requirements for all mobile stations within a given radio communication system are satisfied. Generally speaking, the balanced steady state may be achieved by transmitting to each mobile station using power levels which are neither too high nor too low. Transmitting messages at unnecessarily high levels raises interference experienced at each mobile receiver, and limits the number of signals which may be successfully communicated on the common channel (e.g. reduces system capacity).

Figure 1B:
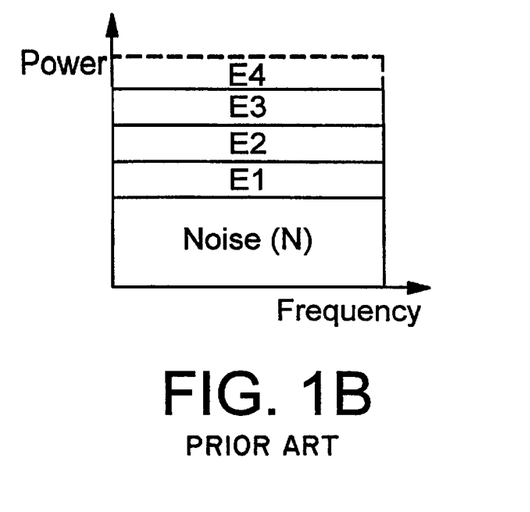
FIG. 1B shows an exemplary distribution of signal energies within a common band after the introduction of a new mobile station.
Figure 1C:
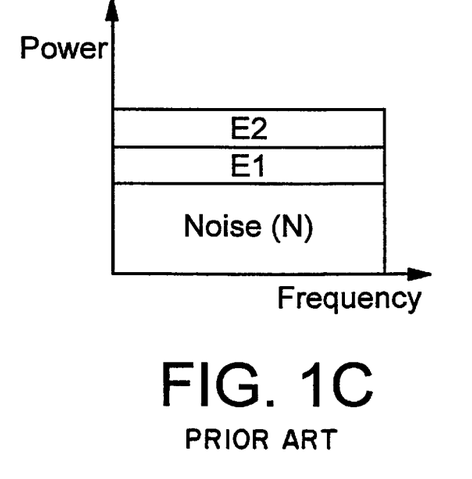
FIG. 1C shows an exemplary distribution of signal energies within a common band after the removal of a mobile station.

A steady state condition must be adjusted for various changes within the mobile communication system. For instance, when a new mobile station enters a communication cell, it will create additional interference within the system. For example, as illustrated in FIG. 1B, the introduction of a fourth mobile station to the steady state condition depicted in FIG. 1A imposes a new signal on the common communication channel with energy E4. This new signal energy E4 adds to the aggregate interference experienced by the first through third mobile stations already in the cell. Accordingly, in order to satisfy the required signal-to-interference ratios of the first through third stations, the power associated with the first three mobile stations E1–E3 may have to be adjusted accordingly. The same disruptive effect may be experienced when a mobile station which was previously located within the boundaries of the radio communication cell switches from a passive state to an active state to transmit or receive a message on the common channel. The steady state condition is also disrupted when a mobile station leaves the radio communication cell. For example, if the steady state condition shown in FIG. 1A is disrupted by the third mobile station leaving the radio communication cell, the signal-to-interference ratio of the remaining two mobile stations will be improved by the absence of the energy E3 on the common channel, as shown in FIG. 1C. Accordingly, the power of signals E1–E2 can be decreased to ensure efficient use of the common communication channel. Again, this same effect may be achieved when the third mobile station within the radio communication cell switches from active to passive state (e.g. by terminating its call).

Figure 1D:
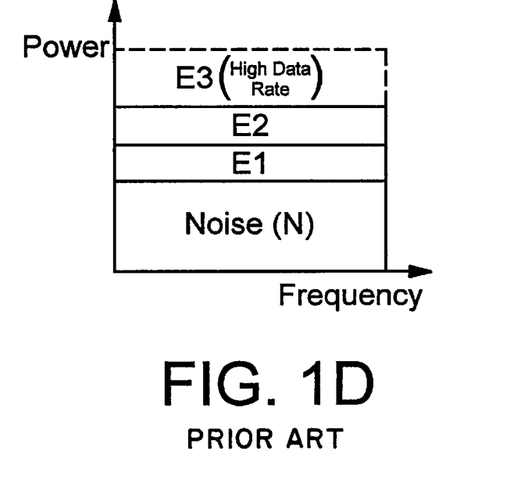
FIG. 1D shows an exemplary distribution of signal energies within a common band after a mobile station switches from low to high data-rate mode.

Still another disruption of the steady state may occur when one or more mobile stations within a radio communication cell changes its operating characteristics. For example, as illustrated in FIG. 1D if the third mobile station switches from a low data-rate mode of communication to a high data-rate mode of communication, the remaining two mobile stations within the cell will experience increased levels of interference. To counteract the increased levels of interference in the communication band, the system may have to adjust the power levels E1 and E2. The reverse effect may occur when a mobile station switches from a high data-rate mode to a low data-rate mode.

Prior CDMA-based systems use one or more power control loops to appropriately adjust the power levels of signal transmission within the system to counteract the above described disruptions to the steady state condition. According to one exemplary prior technique, for the downlink the mobile station monitors the strength at which it receives signals from the base site. If the signals are too weak. the mobile station transmits a message to its associated base station informing the base station to increase the power at which it transmits to the mobile station. The base station will respond accordingly. However, over time, the base will "tease" the mobile station by slowly decreasing the power to the mobile station until the base station is informed by the mobile station to once again increase the power of transmission to the mobile station. This ensures that the base station is not communicating with the mobile stations using power levels which are unnecessarily high.

For example, in the case of FIG. 1B where a fourth mobile station enters a cell, the other mobile stations may instruct the base station to increase the level of power to the mobile stations. The base station will respond accordingly by increasing the power by one increment. If still insufficient to satisfy the mobile station's SIR requirements, the mobile stations will repeat their message to the base station, once again requesting the base station to increase the level at which it transmits messages to the mobile stations. This procedure may be repeated through a series of communications between the base and the mobile stations. If the base "overshoots" the power requirements of the mobile stations, it may have to decrease the power levels to the mobile stations.

Figure 1E:
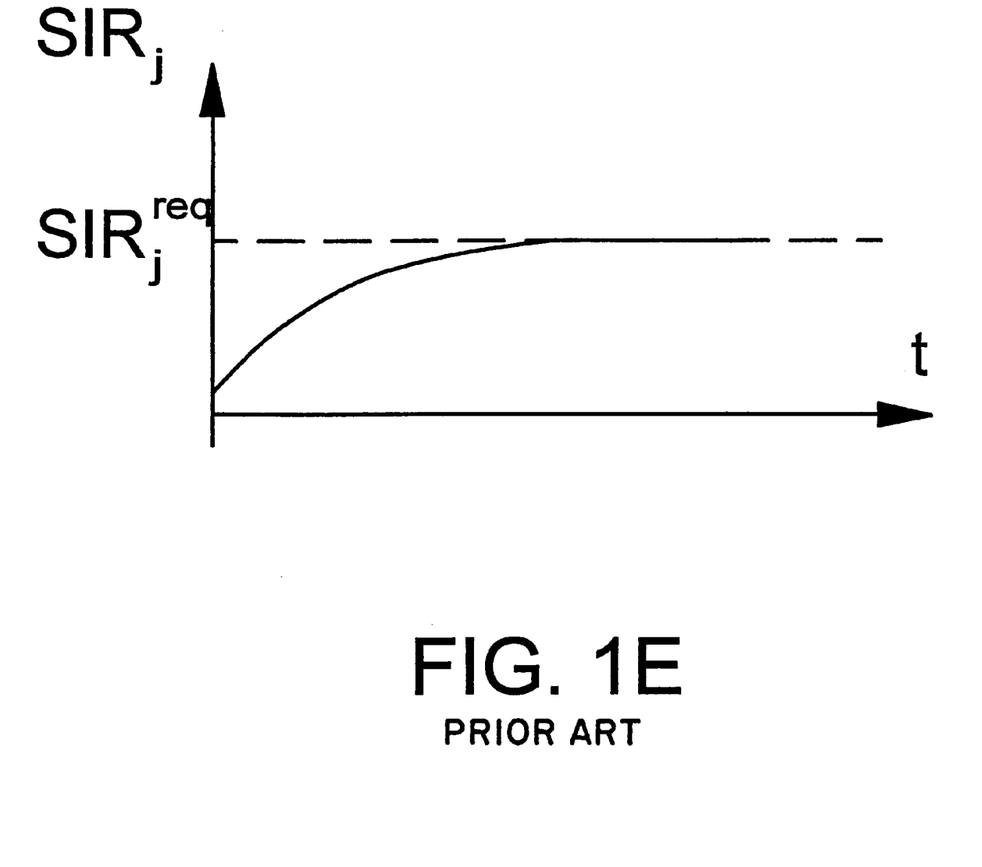
FIG. 1E shows degradation in signal-to-interference ratio caused by the introduction (or removal) of a new mobile station to a radio communication cell according to the prior art.

The iterative nature of this adjustment procedure results in a delay between the time at which a disruption in the interference situation occurs and a time at which the steady state condition is restored. As such, this technique is not well suited for particularly large disruptions to a radio communication system, such as when a high data-rate user suddenly enters a cell comprising only a few mobile users. In this circumstance, as shown in FIG. 1E. the introduction of a new data user at time t=0 will cause a temporary drop in SIR level for user j, which in turn may lead to erroneous signal reception. Such transient peaks in SIR level are particularly common in systems with bursty high data rare users (which are characterized by their discontinuous on-and-off transmission).

It is therefore an exemplary objective of the present invention to adjust the power levels associated with a plurality of mobile stations, in response to the changing needs of the plurality of mobile stations, without resorting to the above described iterative procedure.

SUMMARY

According to exemplary aspects, the present invention achieves the above stated objectives by employing power presetting. More particularly, the present invention detects the introduction or removal of mobile stations to a cell, or the change in operating characteristics of one or more mobile stations already within the cell. In response thereto, the present invention determines the power adjustments in the downlink and the power target adjustments in the uplink necessary to maintain the signal-to-interference ratios required by the mobile stations within the cell.

In the case of downlink power presetting, a change in the number or operating characteristics of mobile stations within a cell triggers a power presetting algorithm which calculates an adjustment in the power levels to each mobile station within the cell to compensate for the change. The algorithm may employ matrix processing to calculate the necessary power adjustments as a function of the SIR requirements of the mobile stations within the cell. Alternatively, the power adjustments can be calculated using an iterative algorithm.

In the uplink, the base station estimates the change in interference which will be caused by a mobile station changing its operating characteristics. In response thereto, the base station computes an updated power target for each mobile station. The base station compares the updated power targets for each mobile station with the actual strength of signals received from each respective mobile station. If the power target and received signal strength differ, the base station transmits a command to the appropriate mobile station instructing it to increase or decrease its transmit power.

In the uplink power presetting, the base station may be apprised of the imminent introduction or removal (or change in operating characteristics) of a mobile station by receiving a control preamble from the mobile station. Alternatively, the base station may detect the change in power requirements from the actual receipt of data from the mobile stations.

In both uplink and downlink cases, power presetting need not be performed for every change in mobile stations using the system. Rather, power presetting can be reserved for only those changes which present significant disruptions to the signal-to-interference ratios of the mobile stations within the cell. For instance, power presetting may be performed when the ratio of the power requirements of a new mobile station to the aggregate power requirements of the other mobile stations within a cell exceeds a prescribed threshold.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

Figure 2:
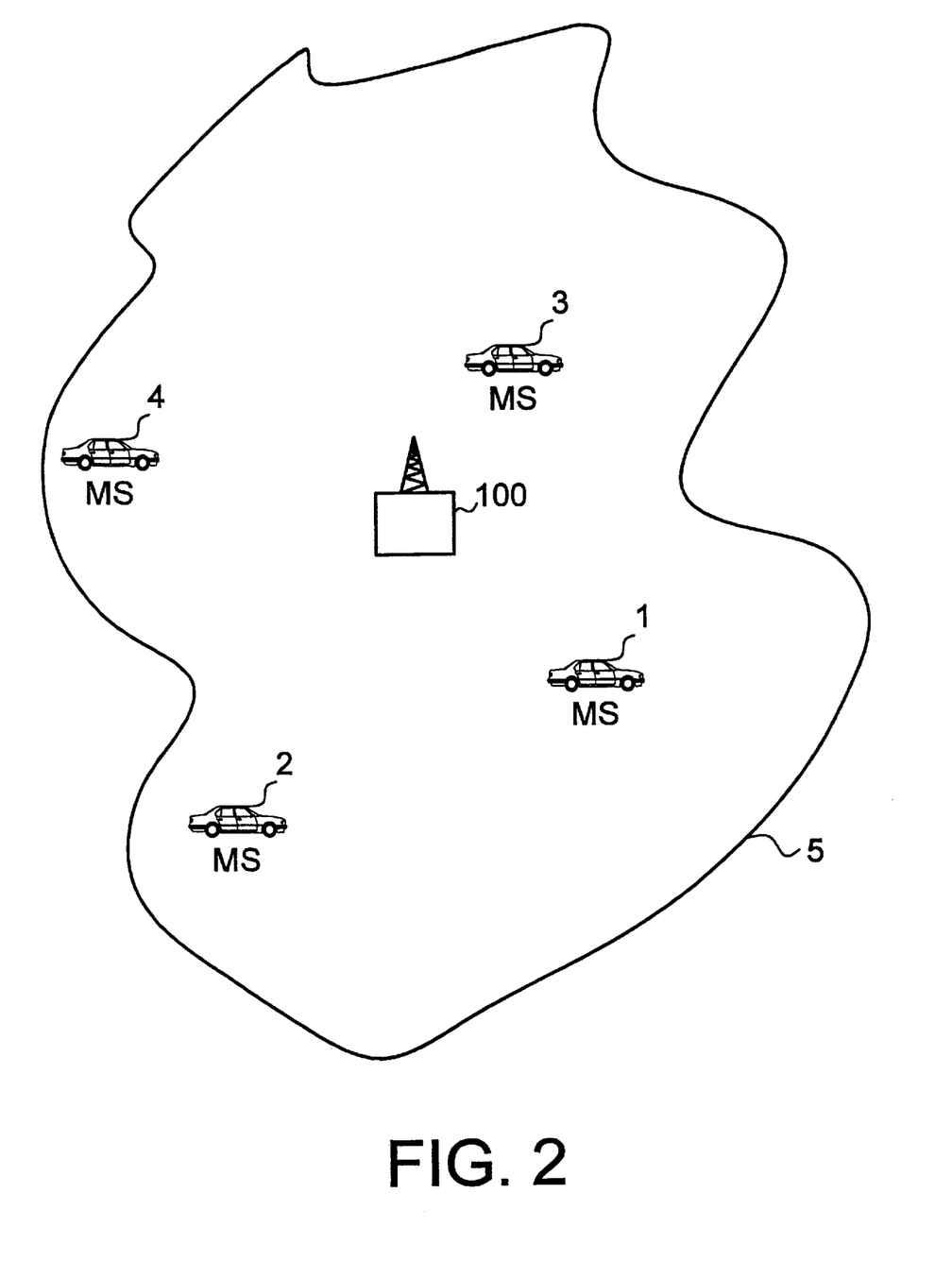
FIG. 2 is a cell diagram illustrating a base station and several mobile stations.

Consider the exemplary situation depicted in FIG. 2. Therein, a base station 100 is currently handling connections with three mobile stations, M1, M2 and M3. For the purposes of this exemplary embodiment, consider that the system depicted in FIG. 2 operates using a CDMA technology with duplexed downlink (i.e. base-to-mobile direction) and uplink (i.e. mobile-to-base direction) channels. In the downlink, base station 100 transmits to each of mobile stations M1, M2 and M3 using a certain power level associated with each of these mobile stations. In the uplink, mobile stations M1, M2 and M2 communicate with base station, each using a certain power level. Although not shown, the base station 100 is in communication with a radio network controller (RNC), which in turn is connected to a public switched telephone network (PSTN).

Figure 3:
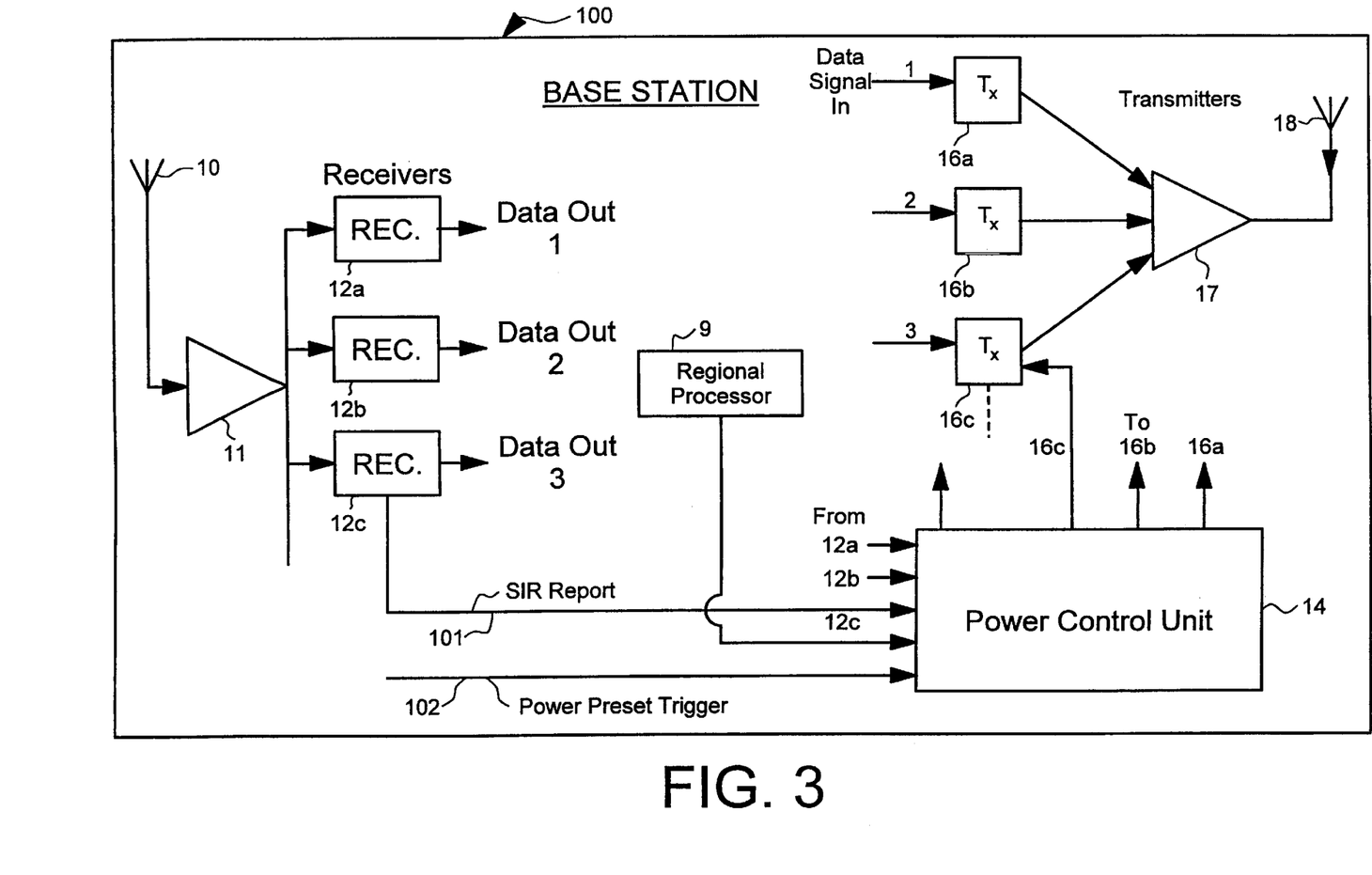
FIG. 3 is a block diagram of a base station according to an exemplary embodiment of the present invention.

As illustrated in FIG. 3, the base station 100 is equipped with a plurality of transmitters 16 (only three transmitters 16a, 16b, 16c are illustrated to simplify the figure) for transmitting different data signals to a plurality of mobile stations via a transmitter amplifier 17 and an antenna 18. The relative power level of each transmitted signal is determined by a power control unit 14. As will be described in more detail below, the power control unit 14 according to the present invention estimates the power presetting necessary to counteract the introduction or removal of high data-rate users from a radio communication cell, or the change in operating characteristics of one or more mobile stations already within the cell. The power control unit receives signal-to-interference information via input 101, and receives a power preset trigger signal (to be described below) via input 102. A regional processor 9 controls the overall operation of the base station 100.

Figure 4:
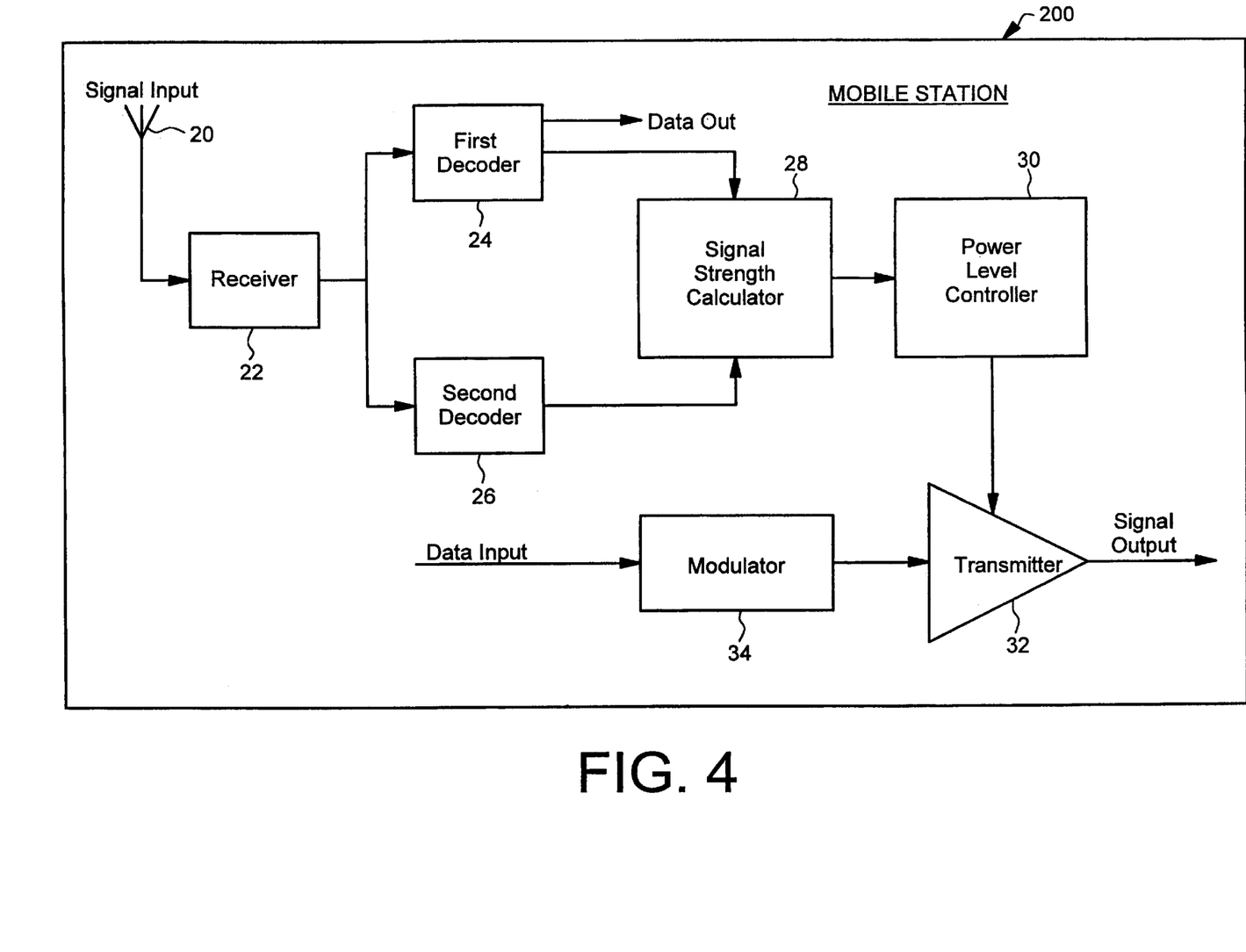
FIG. 4 is a block diagram of a mobile station according to an exemplary embodiment of the present invention.

According to FIG. 4, an exemplary mobile station 200 (e.g., any one of M1–M4) is equipped with a receiver 22 which operates in a conventional manner to filter, amplify and demodulate a signal from antenna 20. A first decoder 24 is provided for selectively receiving and decoding its intended signal transmitted from the base station 100 and measuring its signal strength. Data signals demodulated in the first decoder are generated as output data signals for subsequent use. Other signals transmitted from the base station 100 intended for other mobiles within its cell are received and decoded in a second decoder 26 where their respective signal strengths are measured. A signal strength calculator 28 receives the signal strength measurements from both of the first and second decoders 24 and 26 and calculates a transmission power for the mobile 200 to use in transmissions to the base station 100. The data input signals to be transmitted from the mobile 200 to the base station 100 are received in a modulator 34. A transmitter 32 receives the modulated signal. Based on the received signal strength power calculated by the signal strength calculator 28, a power level controller 30 varies the power of the transmitter 32 to transmit a mobile output signal.

Any known power control loop technique may be employed to coordinate the activities of the downlink power control and the uplink power control. For instance, the system may use the control loop technique identified in U.S. Pat. No. 5,345,598 to Paul W. Dent, which is incorporated by reference herein, or the dynamic power control discussed hereinabove in the background section of the present application. The power presetting employed by the present invention is preferably used to supplement any conventional power control technique. More particularly, the power presetting algorithm of the present invention preferably comes into play when there are large disruptions in the power requirements of the mobile station, as described below.

Power Presetting in the Downlink

Consider again the situation illustrated in FIG. 2. Assume that at time t the base station 100 is currently connected to mobile stations M1, M2 and M3, but at time t+Δt receives a request to handle a connection with mobile station M4 which has recently moved into its service area. Alternatively, M4 may have been in the service area. At time t+Δt M4 switches from passive to active state (that is, M4 requests and is allocated a traffic channel to handle a call or connection), or switches from a low data rate mode to a high data rate mode.

The introduction of M4 into the pool of active mobile stations, or the change in operating characteristics of M4, imposes a new downlink transmit power level $P_{N+1}$ at the base station. As illustrated schematically in FIG. 5, the imposition of new power level $P_{N+1}$ 54 alerts the system that the power levels 52 of the connected mobile stations need to be adjusted to prevent increased levels of interference.

Figure 5:
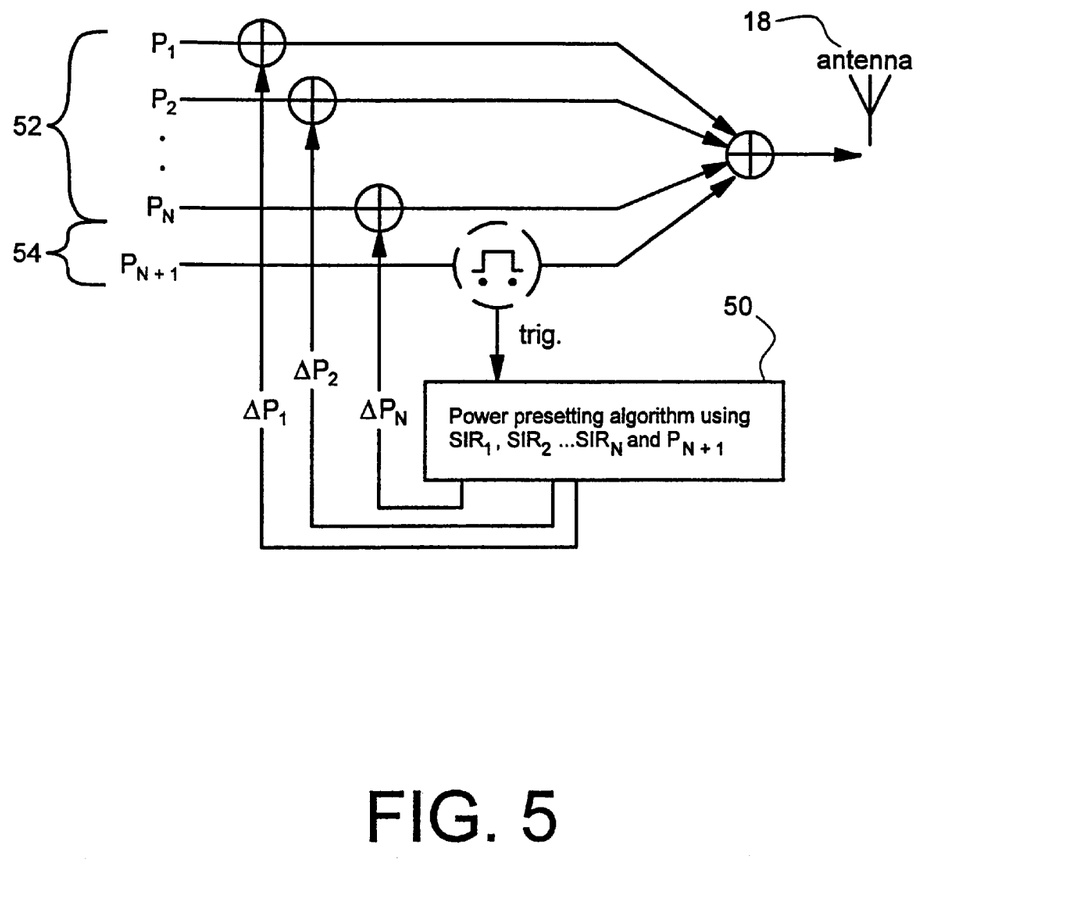
FIG. 5 is a block diagram modelling power calibration according to an exemplary embodiment of the present invention.

Specifically, power $P_{N+1}$ triggers a power presetting algorithm 50 (through line 102 in FIG. 3) which determines a plurality of power adjustment factors to be applied to each power level 52 ($P_1$–$P_N$) The power presetting algorithm 50 may be implemented by power control unit 14 of FIG. 3. Power control unit 14, in turn, may comprise a central processing unit or other appropriate digital logic circuitry.

The power adjustment factors may be determined as follows for the case of non-orthogonal channels. As a starting point, note that the signal-to-interference ratio (SIR) of a particular mobile station j (denoted $MS_j$) at time t may be expressed as:

$$SIR_j|_t = \frac{C_j}{I_j^{inter} + \sum_{i=1, i \neq j}^{N} C_i} \quad (1)$$

where $SIR_j|_t$ is the signal-to-noise ratio of a particular mobile station j at time t; $I_j^{inter}$ is the intercell interference experienced by $MS_j$, $C_j$ is the received power strength at $MS_j$, and N is the number of mobile stations currently transmitting in the system. The equation can be expressed in terms of transmitted power at the base station by noting that $P_j = L_j * C_j$, where $P_j$ is the power at which the base station transmits to $MS_j$ and $L_j$ is the loss factor between the base station and $MS_j$. The new expression in terms of base station power is:

$$SIR_j|_t = \frac{P_j}{I_j^{inter} L_j + \sum_{i=1, i \neq j}^{N} P_i} \quad (2)$$

Taking into account all N mobile stations, the following equation is derived:

$$A_N \cdot \overline{P_N}|_t = \overline{I_{fix}} \quad (3)$$

where $$\overline{P_N}|_t = \begin{bmatrix} P_1 \\ P_2 \\ \ldots \\ P_N \end{bmatrix} \quad (4)$$

$$A_N = \begin{bmatrix} \frac{1}{SIR_1} & -1 & -1 \\ -1 & \frac{1}{SIR_2} & -1 \\ \ldots & \ldots & \ldots \\ -1 & -1 & \frac{1}{SIR_N} \end{bmatrix} \quad (5)$$

and $$\overline{I_{fix}} = \begin{bmatrix} I_1^{inter} \\ I_2^{inter} \\ \ldots \\ I_N^{inter} \end{bmatrix} \quad (6)$$

Optimum power levels after a user N+1 has started transmission at time t+Δt are:

$$A_N \cdot \overline{P_N}\big|_{t+\Delta t} = \overline{I_{fix}} + \begin{bmatrix} 1 \\ 1 \\ \ldots \\ 1 \end{bmatrix}_{N \times 1} \cdot P_{N+1}\big|_{t+\Delta t} \quad (7)$$

The change in power may be expressed as $\Delta P_N$ such that:

$$\overline{\Delta P_N} = \overline{P_N}\big|_{t+\Delta t} - \overline{P_N}\big|_t \quad (8)$$

which, using the above equations, may be expressed as:

$$\overline{\Delta P_N} = A_N^{-1} \cdot \begin{bmatrix} 1 \\ 1 \\ \ldots \\ 1 \end{bmatrix}_{N \times 1} \cdot P_{N+1}\big|_{t+\Delta t} \quad (9)$$

$\Delta P_N$ is a vector which provides the power adjustments used according to the present invention to compensate for the introduction of new user $P_{N+1}$. Furthermore, equation (9) can be used to account for the removal of a pre-existing user simply be setting $P_{N+1}$ to a negative value.

The SIR values may be transmitted by each respective mobile station to the base station. Alternatively, the base station may estimate (e.g. approximate) the SIR values by taking into account various factors, such as the characteristics of the channel and the data service associated with each mobile station. The estimation may comprise using some measurement instead of a SIR value, for example frame error rate. In any event, these values should be slowly varying for a given set of mobiles (e.g. the SIR values represent the required SIR or "target SIR" level for each mobile station). Accordingly, the inverse matrix $A_N^{-1}$ can be computed off-line and post multiplied with the vector of ones. Hence when one (or more) new user begins transmitting it is possible to adjust the power levels virtually instantaneously by multiplying the scalar $P_{N+1}$ with a pre-computed remainder of the equation (9). If k users begin transmitting data streams simultaneously then:

$$P_{N+1} = \sum_{i=1}^{k} P_{N+i} \quad (10)$$

According to another embodiment, presetting can be obtained by resorting to an iterative procedure. More specifically, equation (2) can be reexpressed as follows:

$$SIR_j = \frac{P_j}{I_j^{inter} + I_j^{intra}} \quad (11)$$

where $$I_j^{intra} = \sum_{i=1, i \neq j}^{N} P_i \quad (12)$$

Rearranging the above equations for $P_j|_t$ in terms of $SIR_j$ results in:

$$P_j|_t = SIR_j \cdot (I_j^{inter} \cdot L_j + I_j^{intra}) \quad (13)$$

The change in power caused by the introduction of a new user at time t+Δt may be expressed as:

$$\Delta P_j = P_j|_{t+\Delta t} - P_j|_t \quad (14)$$

$$\Delta P_j = SIR_j \cdot (I_j^{intra}|_{t+\Delta t} - I_j^{intra}|_t)$$

Rearranging the above equations to express $P_j|_{t+\Delta t}$ in terms of $P_j|_t$ and ΔP results in:

$$P_j|_{t+\Delta t} = P_j|_t + \Delta t \quad (16)$$

Figure 6:
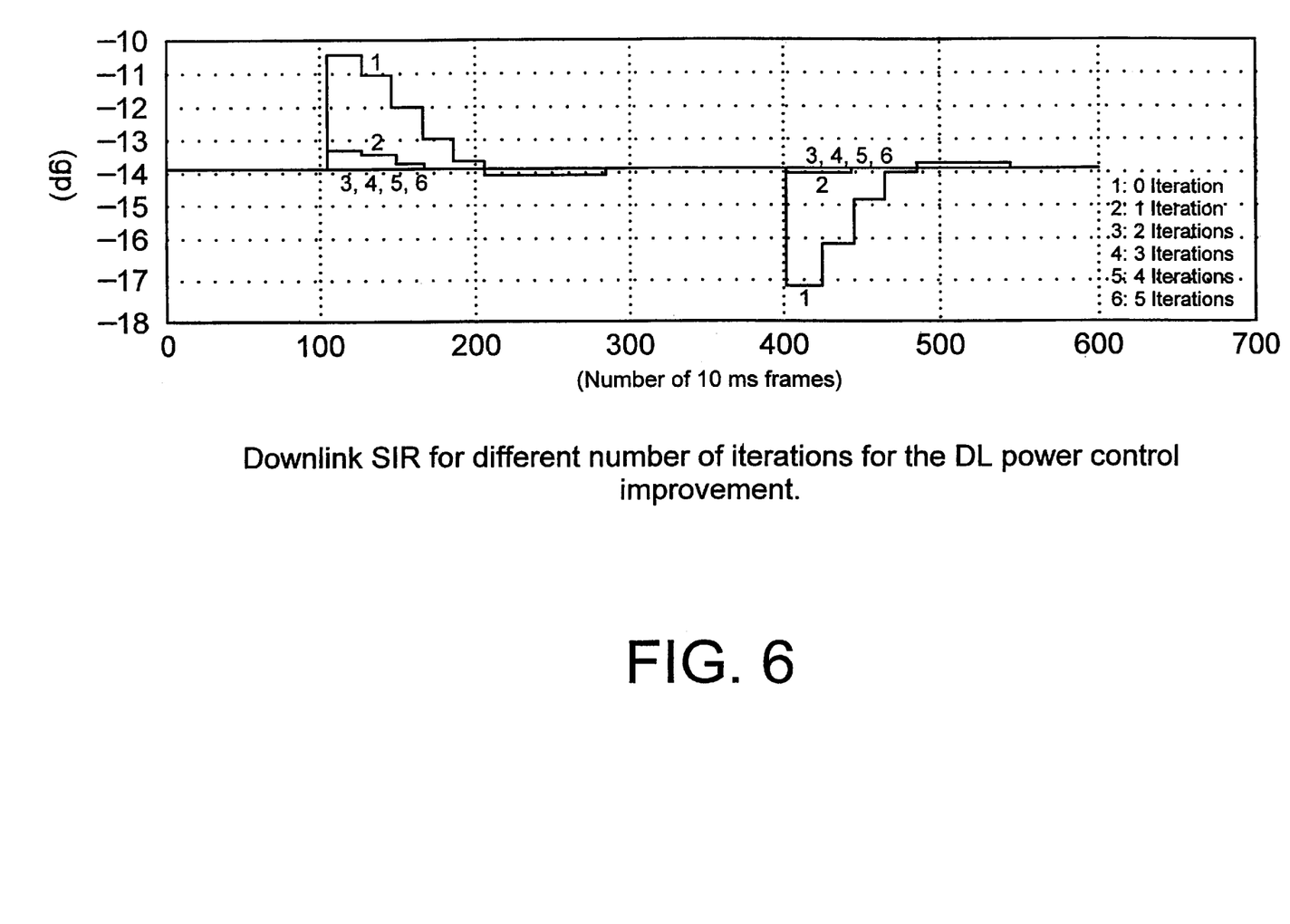
FIG. 6 shows the performance of an iterative power presetting algorithm according to the present invention.

Equation (16) is employed to calculate a new $P_j$ based on the prevailing intracell interference in the cell when a new mobile station enters the cell. This new $P_j$ is applied in the downlink causing a change in the intracell interference. In response thereto, a new $P_j$ is calculated with the current intracell interference measure. The above procedure can be repeated a plurality of times in iterative fashion (e.g. 5 times). Upon each iteration, the value of $P_j$ converges to its ideal value. FIG. 6 illustrates the simulated performance of power presetting in the downlink using the above described technique for different iterations 0–5. The swings in SIR level at 100 (10 ms frames) and 400 (10 ms frames) illustrate the experienced SIR degradation at a mobile station j in response to a high data-rate user's bursty discontinuous transmission (e.g. starting and stopping transmission). Note that the deleterious effects of SIR disruption are virtually removed after only 3 iterations.

In both of the above embodiments, presetting need not automatically occur upon every change in mobile stations entering or leaving a cell. The power control in the base station can be configured such that the power presetting is only performed when the new data user significantly disturbs the preexisting steady state condition within the cell. Whether or not a change is "significant" may depend on one or more of the following factors: the number of mobile stations currently within a cell, the ratio of the power requirement of a new mobile station to the aggregate power requirements of all active mobile station within a cell, and the required signal-to-interference ratio of the new mobile station.

Power Presetting in the Uplink

Power presetting in the uplink may be performed in a manner which is computationally less intensive compared to the downlink. In the uplink, the base station computes a power target for each mobile station. The power target for a mobile station is the product of the SIR target for each mobile station (e.g. the required SIR) and an interference estimate. The base station compares the computed power target for the mobile station with received power from the mobile station. A power control command is then transmitted to the mobile station instructing the mobile station to increase or decrease its power accordingly.

When the base station detects that a new user plans to enter the system (or leave the system) it can preset the interference estimate to take account of the power and SIR requirements of the new user. The base station may be apprised of the introduction of the new user through a control channel preamble message which identifies the new user and his data-rate. Alternatively, the base station may initiate the presetting in response to the actual detection of the start of a new message from the new mobile, and the determination of the characteristics thereof (e.g. its data-rate).

Again, the same analysis is applicable to the case where a data user leaves the radio communication cell (e.g. physically travels beyond the boundaries of the cell, or simply discontinues transmission). Also, power presetting in the uplink can be performed when a pre-existing mobile station switches its operating mode from a high data-rate to a low data-rate, or vice versa.

As was the case with the downlink power presetting, the base station may be configured such that power presetting is only performed when the introduction (or removal) of the new mobile station significantly disturbs the other mobile stations' signal-to-interference ratios.

Power Presetting in the Case of Macrodiversity

For the case of macrodiversity, one or more mobile stations may each actually be communicating with more than one base station. For example, consider mobile station M4 illustrated in FIG. 2. Mobile station M4 is located on the outer bounds of the coverage provided by base station 100. As such, mobile station M4 may receive messages containing substantially the same information transmitted from one or more neighboring base stations (not shown). This technique is used to enhance the received signal quality at a mobile station.

Figure 7A:
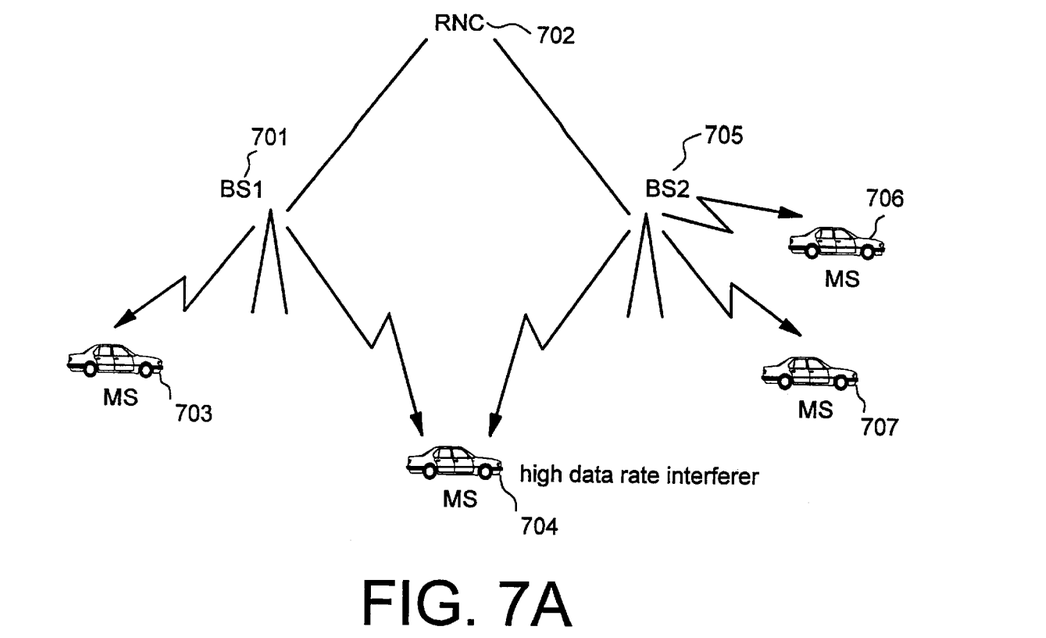
FIG. 7A shows power presetting in macrodiversity according to a first embodiment.

Different downlink power presetting techniques may be appropriate depending on the location of the interferer mobile station within the cells involved in macrodiversity. A first scenario arises, as shown in FIG. 7A, when a high data-rate interferer 704 is in macrodiversity, or in other words, is communicating with both base stations 701 and 705. One technique for power presetting for this interferer is to independently preset the power levels in the downlink for base station 701 and base station 705. More particularly, base station 701 computes the power adjustment values using one of the above described algorithms, treating mobile stations 703 and 704 as members of its cell. Simultaneously, base station 705 computes the power adjustment values, treating mobile stations 704, 706 and 707 as members of its cell. Each base station 701 and 705 will then transmit to the mobile station interferer 704 involved in macrodiversity. The independently computed power adjustment values are used when transmitting to the other mobile stations 703, 706 and 707.

Figure 7B:
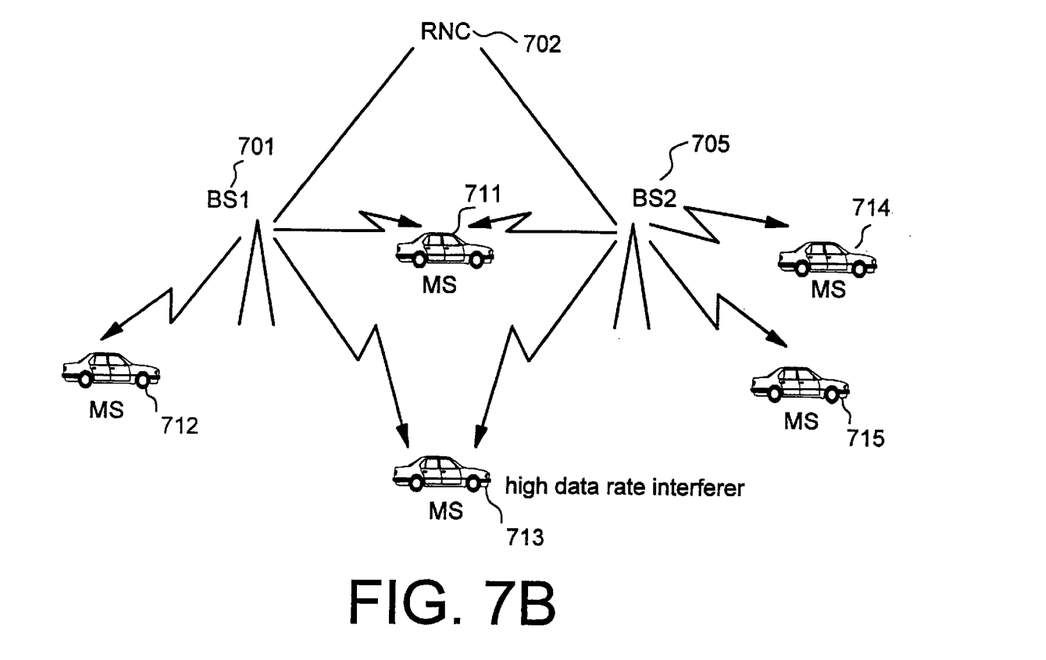
FIG. 7B shows power presetting in macrodiversity according to a second embodiment.

A second scenario is illustrated in FIG. 7B. Here, the high data rate interferer 713 is again in macrodiversity. In addition, there is at least one other mobile station in macrodiversity 711 which suffers interference as a result of interferer 713. In this circumstance, each base station 701 and 705 may again independently perform power presetting, but this time exclude the mobile station 711 from the computations. Such an approximation is acceptable, as the increase in interference suffered by station 711 due to the interferer mobile station 713 is typically small.

Alternatively, the mobile stations 711 involved in macrodiversity may be preset according to the cell that requires the largest power increase. More specifically, base station 701 computes the power adjustment values necessary to compensate for the introduction of the high data rate interferer 713 into the cell, of which mobile stations 712, 713 and 711 are considered members. Similarly, base station 705 computes the power adjustment values necessary to compensate for the introduction of the high data rate interferer 713 into its cell, of which mobile stations 711, 713, 714 and 715 are considered members. Then both base stations 701 and 705 communicate the power adjustment values calculated with respect to mobile station 711 in macrodiversity to the radio network controller 702. The radio network controller chooses the larger of the two values and instructs both base stations to communicate with the mobile station 711 involved in macrodiversity using the larger power adjustment value. Each base station will employ that power adjustment level in transmitting messages to the mobile station 711.

Figure 7C:
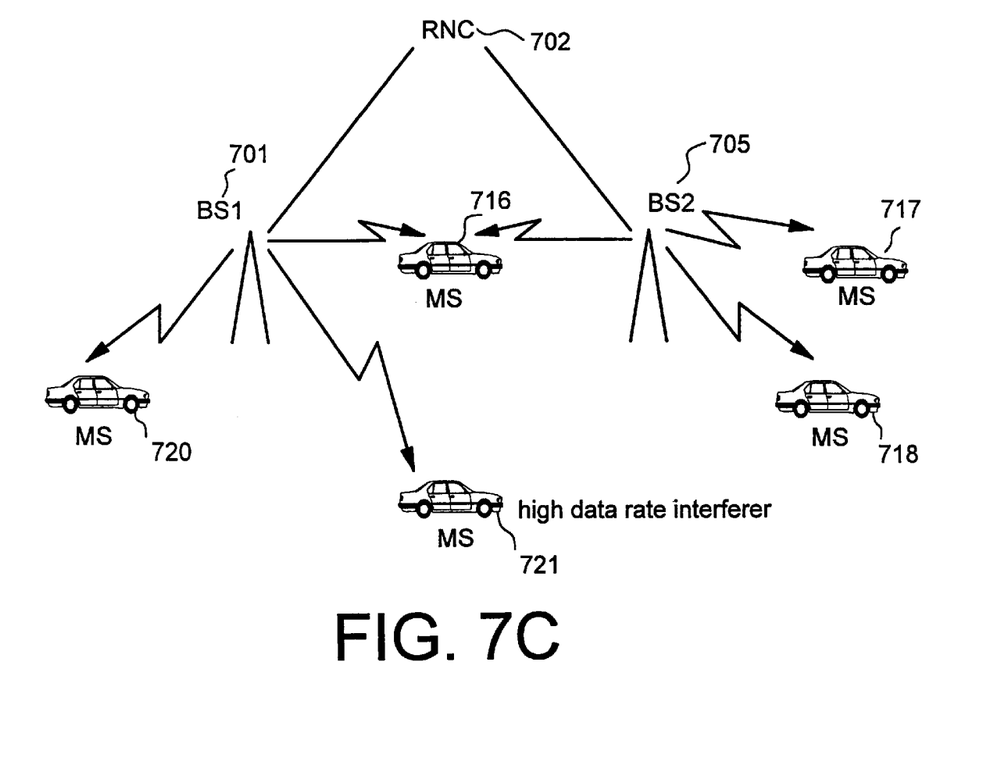
FIG. 7C shows power presetting in macrodiversity according to a third embodiment.

As shown in FIG. 7C, still another scenario may arise when the interferer 721 is not involved in macrodiversity, but affects another mobile station 716 which is involved in macrodiversity. The power presetting for the mobile station 716 may be computed by considering the aggregate effect of interference from the cell associated with base station 701 and the cell associated with base station 705. The radio network controller 702 may perform this computation by, in effect, treating the cells associated with base stations 701 and 705 as a global cell.

For the uplink, presetting of the interference estimate (and consequently the power target) can be done independently in each of the base stations involved in macrodiversity of the new mobile stations.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

By way of example, power presetting equations were derived for the exemplary case of non-orthogonal channels. However, it will be apparent to one skilled in the art that the principles discussed herein are also applicable to systems employing orthogonal channels.

Furthermore, various power macrodiversity power presetting techniques were associated with different arrangements of mobile stations within two or more base stations in macrodiversity. However, it will be apparent to one skilled in the art that the various techniques disclosed above are not restricted to these specific arrangements of mobile stations. For instance, the power presetting described in connection with FIG. 7C can be used to compute the power levels of the mobile stations in macrodiversity shown in FIGS. 7A and 7B.

What is claimed is:

1. A method for presetting power levels in a radiocommunication system, said system including at least a first and a second base stations in communication with a set of mobile stations, at least a subset of said set in communication with both said first and second base stations, including:

transmitting signals from said first base station to mobile stations associated with said first station using a respective power level, and transmitting signals from said second base station to mobile stations associated with said second station using a respective power level, wherein said first and second base stations transmit substantially the same information to mobile stations within said subset of mobile stations;

detecting a change in said set of mobile stations;

determining a plurality of power adjustment values for application to each said respective power level to compensate for said detected change in said set of mobile stations; wherein said determining step includes determining a power adjustment value for said subset of mobile stations by independently performing a power adjustment computation with respect to said mobile stations associated with said first base station, and a power adjustment computation with respect to said mobile stations associated with said second base station.

2. The method of claim 1, wherein said determining step further includes the steps of comparing the power adjustment values for said subset from said two independently performed power adjustment computations, and employing the larger of the two to adjust the power levels at which said first and second base stations communicates with said subset of mobile stations.

3. A method for presetting power levels in a radiocommunication system, said system including at least a first and a second base stations in communication with a set of mobile stations, at least a subset of said set in communication with both said first and second base stations, including:

transmitting signals from said first base station to mobile stations associated with said first station using a respective power level, and transmitting signals from said second base station to mobile stations associated with said second station using a respective power level, wherein said first and second base stations transmit substantially the same information to mobile stations within said subset of mobile stations;

detecting a change in said set of mobile stations;

determining a plurality of power adjustment values for application to each said respective power level to compensate for said detected change in said set of mobile stations;

wherein said determining step further includes the step of determining a power adjustment value for said subset by considering interference effects between mobile stations associated with said first base station and mobile stations associated with said second base station.

4. A system for presetting power levels in a radiocommunication system, comprising:

a first and a second base stations for communicating with a set of mobile stations using respective power levels for each mobile station within said set, wherein both said first base station and said second base station communicate substantially the same information to a subset of said set of mobile stations;

detecting logic for detecting a change in said set of mobile stations; and determining logic for determining a power adjustment value to offset said power levels for said change in said mobile stations;

wherein said determining logic determines a power adjustment value for said subset of mobile stations by independently performing a power adjustment computation with respect to mobile stations associated with said first base station, and a power adjustment computation with respect to mobile stations associated with said second base station.

5. The system of claim 4, further including a radio network controller for comparing the power adjustment values for said subset from said two independently performed power adjustment computations, and employing the larger of the two to adjust the power levels at which said fir and second base stations communicates with said subset of mobile stations.

6. A system for presetting power levels in a radiocommunication system, comprising:

a first and a second base stations for communicating with a set of mobile stations using respective power levels for each mobile station within said set, wherein both said first base station and said second base station communicate substantially the same information to a subset of said set of mobile stations;

detecting logic for detecting a change in said set of mobile stations; and determining logic for determining a power adjustment value to offset said power levels for said change in said mobile stations;

wherein said determining logic further determines a power adjustment value for said subset by considering interference effects between mobile stations associated with said first base station and mobile stations associated with said second base station.

7. A method for presetting power levels in a radiocommunication system, said system including at least a first and a second base stations in communication with a set of mobile stations, at least a subset of said set in communication with both said first and second base stations, including:

transmitting signals from said first base station to mobile stations associated with said first station using a respective plurality of transmitting power levels to satisfy predetermined target reception requirements at said mobile stations associated with said first station, and transmitting signals from said second base station to mobile stations associated with said second station using a respective plurality of transmitting power levels to satisfy predetermined target reception requirements at said mobile stations associated with said second station, wherein said first and second base stations transmit substantially the same information to mobile stations within said subset of mobile stations;

detecting a change in said set of mobile stations;

determining a plurality of power adjustment values for application to each said respective plurality of transmitting power levels, based on said predetermined target reception requirements which are known in advance of said change in said set of mobile stations, to compensate the plurality of transmitting power levels for said change in said set of mobile stations, wherein said determining is preemptively performed to reduce disturbances in interference which would be caused by said change.

8. A radiocommunication system for communicating with a set of mobile stations, comprising:

a first base station for communicating with mobile stations associated with said first station using a respective plurality of transmitting power levels to satisfy predetermined target reception requirements at said mobile stations associated with said first station;

a second base station for communicating with mobile stations associated with said second station using a respective plurality of transmitting power levels to satisfy predetermined target reception requirements at said mobile stations associated with said second station, wherein said first and second base stations transmit substantially the same information to mobile stations within a subset of mobile stations;

detecting logic for detecting a change in said mobile stations comprising said set; and determining logic for determining a plurality of power adjustment values for application to each said respective plurality of transmitting power levels, based on said predetermined target reception requirements which are known in advance of said change in said set of mobile stations, to compensate said plurality of transmitting power levels for said change in said set of mobile stations, wherein said determining is preemptively performed to reduce disturbances in interference which would be caused by said change.

* * * * *